United States Patent

[11] 3,624,336

[72] Inventor Joseph V. Martinez
 5631 18th Ave, Montreal, Quebec, Canada
[21] Appl. No. 81,381
[22] Filed Oct. 16, 1970
[45] Patented Nov. 30, 1971

[54] ELECTROCONTOUR MACHINING SETUP AND METHOD
 6 Claims, 4 Drawing Figs.
[52] U.S. Cl. .................................................. 219/69 M,
 204/143 G, 219/69 V
[51] Int. Cl. .................................................. B23p 1/04,
 B23p 1/12
[50] Field of Search ........................................ 219/69 M,
 69 V; 204/143 M, 143 G

[56] References Cited
UNITED STATES PATENTS
| | | | |
|---|---|---|---|
| 2,938,104 | 5/1960 | Paillarse | 219/69 V |
| 3,122,628 | 2/1964 | Inoue | 219/69 V |
| 3,125,664 | 3/1964 | Pfau | 219/69 V |

*Primary Examiner*—R. F. Staubly
*Attorney*—Raymond A. Robic

ABSTRACT: Equipment presently used for electromachining internal contours of hard metal tools, such as dies by spark discharge erosion, utilizing an electrode mounted on a descending head that approaches the work under control of a servosystem that maintains a small clearance, is modified for the machining of external contours by the provision of a rotatable wheel-shaped carbon electrode and a supporting structure for holding and indexing a workpiece and for holding a retractable and precisely resettable steel templet for shaping the electrode mechanically. The position of the templet just above the work facilitates preliminary alignment, which may be made on an instrument bench. External contours are machined one side at a time, using the same templet and templet setting if the configuration is symmetrical. The templet is retracted during electromachining to avoid the risk of any modification of it in the initial stages of electromachining. To prevent the progressive wear of the electrode from producing asymmetry in the work, the templet is repositioned and the electrode dressed to the design contour after every indexing of the work.

PATENTED NOV 30 1971

INVENTOR
Joseph V. MARTINEZ
BY

ATTORNEY

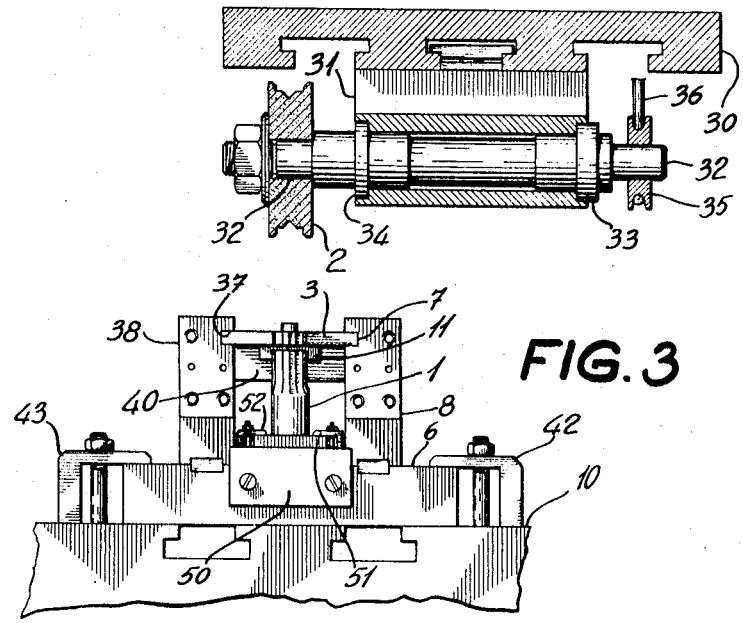
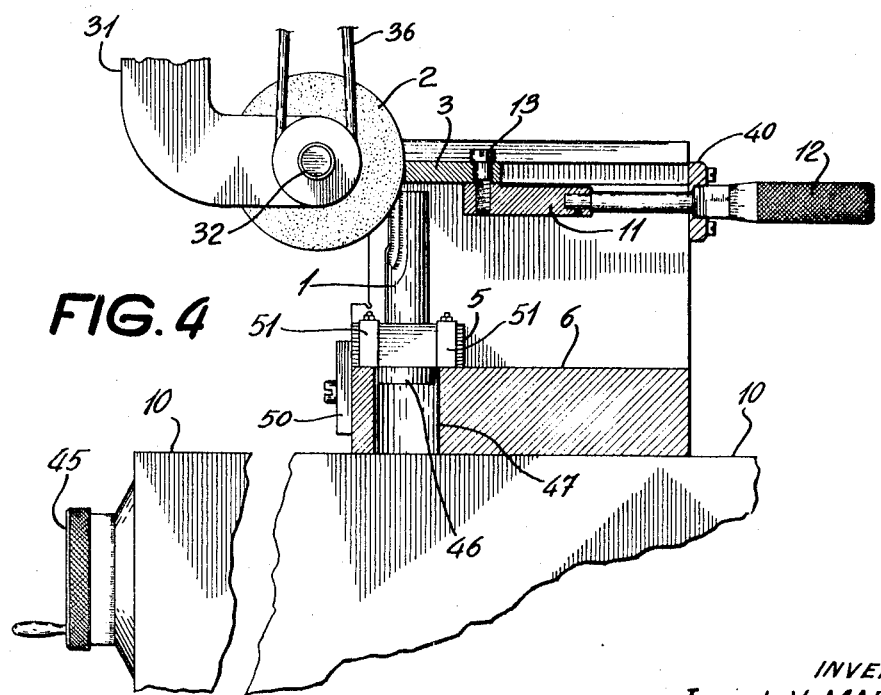

ELECTROCONTOUR MACHINING SETUP AND METHOD

This invention relates to electromachining and, more particularly, to machine setups and method for electromachining metals and alloys of great hardness to particular contours required for tooling.

Electromachining is sometimes referred to as spark-discharge erosion because it operates by bringing an electrode close to a conducting workpiece and imposing a spark-producing electric field, usually in the presence of a dielectric fluid, such as a petroleum fraction of low flash point. The distances involved are small, so that the discharges are small but repeated in rapid succession. The electrode wears away at more or less the same rate as usually slower but sometimes faster depending on the difference of material, and it is common to provide the head of the machine that moves the electrode with a servo system to control the rate and extent of downward advance of the electrode towards or into the work so that the distance will be not less than a predetermined minimum. The electric discharge conditions are very sensitive to the distance in question when the electrode is close enough to maintain a discharge, so that the discharge current or voltage can be used as control signal for the servo system. An open circuit voltage of about 60 or 80 volts is commonly used. Pulsating voltage may be used instead of continuous so that the intensity of electromachining may be varied by changing the duty cycle of the pulsing, independently of the open circuit voltage.

Although electromachining has certain advantages for hard materials, it is particularly effective in machining more complicated contours, because the shape of the electrode determines the shape of the cut or bore machined into the work. Electrocontour machining has come into considerable use for cutting dies, particularly dies made of hard alloys for use with a punch in the forming of metal articles and parts.

The electrode for making the die can be given the same contour as the punch by making it at the same time, using a prolongation of the blank from which the punch is made, such prolongation being made of suitable electrode material, such as copper or copper-tungsten, and being subjected to the same mechanical machining as the punch. The electrode so made can then be mounted on a head of an electromachining equipment and the die blank then accurately centered and aligned on the machine table, usually with the help of a pilot hole or forebore previously made in the die blank. In operation the machine head causes the electrode to descend towards and into the work while a dielectric fluid is caused to flow between the electrode and the work and an electric potential the thickness of the die, the longer the electrode must be, because the electrode wears away in use. Fortunately, the portion that has already been cut does not suffer further erosion because the electric discharge is concentrated where the clearances are least. The advance of the head of the machine is, as previously mentioned, controlled by a servo mechanism which is sensitive to the minimum clearance.

Many refinements have been made for using such machines fluid by applying suction near the work results in greater accuracy of the fluid into the machining zone. The electrodes are often made with two stages of different thickness, with the intention he applied power will be reduced (by reducing pulse duration) with the result of providing a finishing operation which produces relatively little removal of material. These refinements are not further discussed in connection with the machining of external contours in accordance with this invention, but it will be understood that such refinements can also be added to the methods of the present invention to improve the accuracy and predictability of the machining.

It has been found difficult to use the type of equipment just referred to for making the corresponding punches. Since in the case of a punch it is the external contour rather than an internal contour that must be machined, hollow electrodes with a cavity of the desired configuration have been tried for this purpose. One of the difficulties with such electrodes has been to provide the flow of machining fluid in such a case. The expedient of having the work descend into the electrode rather than the electrode into the work has been considered as one way of improving the fluid flow pattern. Furthermore, when the punch is being made rather than the die, the erosion of the electrode no longer conveniently occurs mostly at the tip, because it now occurs on the surfaces of certain work piece configurations it is necessary to build the electrode in layers and to stop the operation from time to time to remove used layers.

By the present invention it is possible to shape punches and to impose external contours on hard alloys as effectively and conveniently as dies have heretofore been machined, using the same basic equipment of machine table, machine head, fluid supply, discharge potential supply and clearance-sensitive servocontrolled By this invention there is no attempt to machine the entire periphery of a punch in one operation. Instead it is machined one side at a time. A rotatable electrode is used to increase the usable electrode length without requiring the work to be stopped to remove a used portion of the electrode. Furthermore, a retractable and resettable templet is provided, close to the work, on which the electrode can be shaped, so that the electrode can be freshly shaped for each side of the punch, and likewise for multiple passes on the same side if the length of the cut should require more than one pass.

The same setup and operating method, with an indexing system using smaller steps, can be used for electromachining each of the teeth of a milling machine cutter to an identical configuration. Still other applications of the invention to shaping external contours of hard metal parts or inserts to precise tolerances will be apparent.

In the drawings which illustrate one embodiment of the invention suitable for practice of the methods of the invention:

FIG. 3 is a front elevation, partly in section and partly broken away, of a machine setup according to the invention; and FIG. 4 is a side elevation, partly in section and partly broken away, of the same setup with the electrode moved into shaping position.

Figure 1:
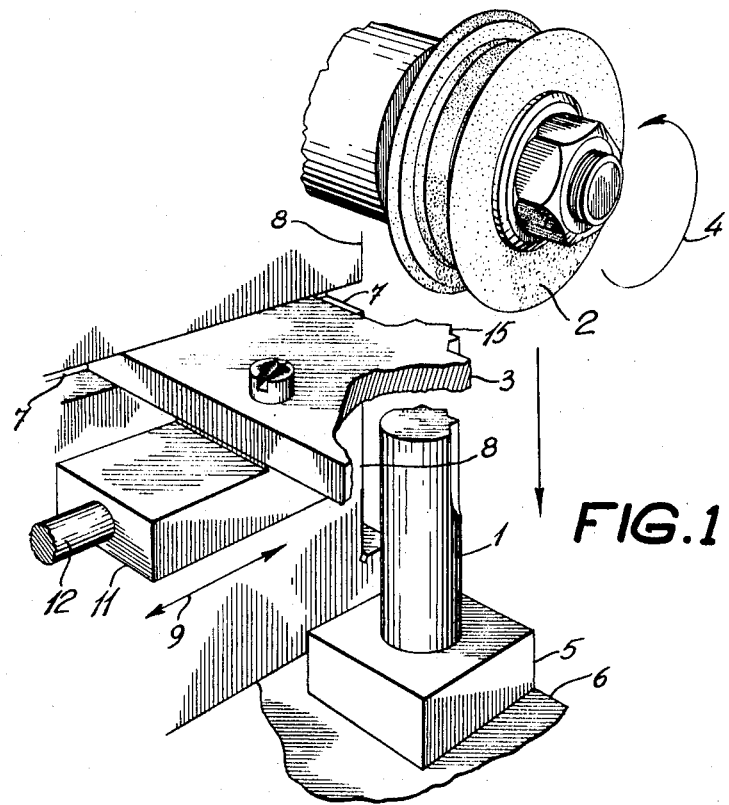
FIG. 1 is a perspective view of an electrode, templet and workpiece showing their relation in the practice of the invention, with most of the rest of the setup broken away for purposes of illustration.

FIG. 1 shows the operative relationship of a workpiece in the electrocontour machining of a punch. For purposes of illustration the workpiece 1 is shown already machined on one side, so that its alignment relation with the templet 3 can better be illustrated and for the same reason part of the templet 3 is broken away. The electrode 2 is in the form of a wheel mounted on a horizontal axis carried by the movable head (not shown) of an electromachining equipment. In a working stroke the electrode moves downward in a highly precise rectilinear motion at a controllable speed while being rotated in the direction shown by the arrow 4.

The workpiece 1 is held firmly in a mounting 5 fixed on the base plate 6 which is in turn firmly held to the table 10 (see FIGS. 3 and 4) of the electromachining equipment. The templet 3 is mounted at its side edges in guide channels, one of which is shown at 7, by means of mountings (also fixed on base plate 6) one of which is shown at 8, so that templet 3 is movable only in a horizontal direction perpendicular to the axis of the electrode 2, as shown by the arrow 9. Templet 3 is fastened near its rear edge to an adjusting plate member 11 by which the templet 3 may be moved back and forth in the directions shown by the arrow 9 by means of a micrometer drive 12 which is sufficiently accurate to permit the templet 3 to be precisely reset to a former position after having been moved therefrom. The fastening of templet 3 to plate 11 may be by a machine screw 13, shown, or by a tooling pin and its associated recess, in which case the plate 11 is provided with tabs (not shown) to engage channels 7 which are fastened after the plate 11 has been assembled to micrometer 12 and templet 3, in order to assure the full engagement of the tooling pin.

The electrode 2 is made of carbon, preferably of graphite. It is in a shape of a wheel and in its original state the rim may be flat, concave or convex in any simple shape, because the electrode 2 will be shaped by the templet 3 to the particular contour desired for electromachining. In FIG. 1, the electrode 2 is shown as already shaped by the templet 3.

Before the electrode 2 is shaped for electromachining, the workpiece (at that time uncut and not already machined as shown in FIG. 1) must be precisely aligned with the templet 3. This does not need to be done on or near the machine which carries the electrode 2. The base plate 6 of the setup as shown in FIGS. 3 and 4, is a massive member which carries the workpiece mounting 5 and the two structures like the mounting 8 which support the templet 3 and the micrometer drive 12, so that all these setup components can be assembled and the initial alignment of the workpiece and the templet precisely determined on a suitable instrument bench. Thereafter these structures may be firmly fixed on the table 10 of the machine and the fine adjustment of the position of the structure with respect to the electrode 2 will then be made by horizontal motion of the table provided by the usual lead screw mechanism (45 in FIG. 4).

Thus the templet 3 can be brought, by manipulation of the table on which the base plate 6 rests, into a position which will cut the periphery of the electrode 2 into the desired shape for electromachining while the electrode 2 is rotated. The table movement is used to adjust the depth of cut to the shape of the working contour 15. The templet is usually made steel of a hardness sufficient for shaping carbon or graphite electrodes.

After the electrode 2 has been shaped by turning it against the contoured portion 15 of templet 3, which may be done with or without the flow of machining fluid and with the electrode 2 revolving at a speed between 15 and 60 revolutions per minute, templet 3 is retracted, so that it cannot possibly be affected by electromachining operation. Then the flow of electromachining fluid, provided by means not shown, is established over the surface of the electrode nearest the workpiece and over the workpiece, the electromachining potential is applied between the workpiece and the head of the machine is caused to start moving downward, under the control of the servomechanism normally provided with an electromachining equipment for adjusting the downward movement upon approach of the electrode to the workpiece so that the clearance between the electrode 2 and the workpiece 1 remains small but never goes below a predetermined minimum of the order of ½ mil. As in the case of graphite electrodes generally, the electrode 2 should be at negative relative potential and an ample supply of the electrode 2 is caused to rotate at a rate between 4 and 25 revolutions used mostly for precision finishing with small clearance and less current. The direction of rotation shown on FIG. 1 is used in from the surfaces of the workpiece and of the electrode should be carried downward and away with the flow of electromachining fluid, rather than upward whence the particles would fall back through the spark discharge area.

In the usual operation of forming a punch for metal working, a single pass of the electrode 2 down one side of the workpiece will succeed in machining the workpiece to the desired tolerance before the erosion of the electrode 2 reduces the depth of cut to an undesirable degree. Since that erosion is cumulative, however, before the electrode is used to cut the other side of the workpiece, it is desirable to dress the surface of electrode 2 with templet 3. Likewise, if the length of cut desired on one side of workpiece 1 is such that it cannot be done in one pass without exceeding the tolerance desired for the machining operation, then, after machining has been carried on for a predetermined length of cut, the electromachining operation may be stopped, the electrode 2 raised and reshaped before electromachining is resumed. To reshape electrode 2, templet 3 is first reset by the micrometer drive 12 to its previously determined working position. Then the electrode 2 is rotated at a speed between 20 and 60 revolutions per minute while the table 10 is moved to bring templet 3 slightly closer to the axis of electrode 2 until the working contour of templet 3 fully engages the electrode. Then templet 3 may again be retracted, electromachining conditions restored and the head put under electromachining control so that it will move down controllably and accomplish further machining of workpiece 1.

Figure 2:
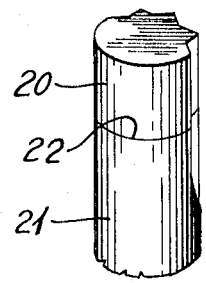
FIG. 2 is a perspective view of a particular type of workpiece for practice of the invention.

FIG. 2 shows the upper part of a workpiece for machining a punch and at the same time an electrode for making the mating die. The tip portion 20 is made of electrode material, preferably copper or copper-tungsten rather than carbon, because the metallic- material is more readily attached to and removed from the remainder of the workpiece without impairment of either portion. The lower portion 21 of the workpiece is made of a hard alloy, in order to serve as a punch. The boundary between the hard alloy and the electrode material is shown at 22. As shown in FIG. 2 one side of a composite workpiece has already been machined. In this case the electrode for the die is itself made by the same electromachining procedure as is used for making the punch. This procedure assures close control of the clearance between the die and the punch, because variations from the desired exact contour that may occur in making the punch occur also in making the electrode for the die and hence do not contribute to irregularity in the clearance.

FIGS. 3 and 4 show the setup for practicing the present invention without the omissions made in FIG. 1. FIG. 3 is an elevation from the front or electromachining side of the setup. The electrode 2 is shown in FIG. 3 raised above the workpiece 1 and the templet 3 by the machine head 30. Only the bottom portion of machine head 30 is shown in FIG. 3, that portion being a member to which the bracket 31 is fastened. The bracket 31 is also shown in FIG. 4, but the machine head and its connection thereto does not appear in FIG. 4 but the machine head and its connection thereto does not appear in FIG. 4 because the upper part of bracket 31 is there shown broken away.

Bracket 31 supports axle 32 by means of bearings 33 and 34. The electrode 2 is mounted on one end of axle 32 in such a way as to be readily removable and replaceable. At the other end of axle 32 a drive pulley 35 is fixed, which serves to produce rotation of electrode 2 in accordance with motion transmitted by a belt 36 from a motor and reduction gear (not shown) mounted on the machine head. The speed of the rotor is controllable (by means not shown) over a range that will permit rotation of the electrode 2 at speeds between 4 and 60 revolutions per minute. This range of speed can be provided in two or three subranges by the use of a multiple groove pulley (not shown) for the belt 36. In some installations a maximum speed of 25 revolutions per minute will be sufficient because the electrode material will be soft enough and the templet hard enough for shaping the electrode at that speed. The appropriate cutting speed depends also on the electrode diameter, since that affects the circumferential velocity.

FIGS. 3 and 4 show that the templet 3 is mounted closely above workpiece 1, somewhat more closely than shown in FIG. 1, in order to facilitate accurate alignment.

As shown in FIG. 3, templet 3 is supported in channels 7 and 37 respectively provided in mounting structures 8 and 38, both of which are fixed on base plate 6, one on each side of workpiece 1. In order to show the workpiece the structures on base plate 6 are shown in section on a plane bisecting workpiece 1 side elevation in FIG. 4.

The mounting structures 8 and 38 also support micrometer control 12 by means of a backplate 40. Micrometer 12 serves to determine precisely the working alignment position of templet 3 as well as to retract templet 3 from that position and to reset it in that position.

The base plate 6 is firmly mounted on table 10 of the electromachining equipment ( which is not shown except for portions of table 10 and head 30) by means of clamps 42 and 43. The electrode 2 must be kept from touching workpiece 1 during the shaping operation, however, so that the larger its diameter and the deeper the cut made in shaping, the greater must be the distance necessary between templet 3 and workpiece 1 to prevent interference with the shaping operation by the workpiece and to avoid a short circuit at the start of electromachining.

As previously mentioned, table 10 is in its entirety subject to precision positioning by a screw type mechanism. In FIG. 4 positioning control 45 is shown, which is used to move table 10 for adjusting the distance between the axle 32 and templet 3 before dressing the surface of electrode 2 for further machining of workpiece templet 3 for shaping its surface to establish or restore its contour to the exact configuration desired for electromachining.

The mounting 5 on which the workpiece 1 is fixed, as shown in FIG. 4, has a cylindrical bottom projection 46 which fits closely in the cylindrical bore 47 provided in base plate 6. Mounting 5 has a precisely square configuration of such size that any one of its sides can be brought flush with the front edge of base plate 6 without removing the cylindrical projection 46 from its seat, but simply by rotating the mounting about its axis of symmetry. After a selected side of mounting 5 is roughly aligned with the front of the setup, a face plate 50 is fastened on the front edge of base plate 6, overlapping the front edge of the mounting 5, so as to hold the mounting 5 securely against rotation.

Workpiece 1 is accurately centered on the axis of symmetry of mounting 5 when it is mounted, so that when one side of it has been machined, the opposite side may then be presented for machining without disturbing the alignment by removing face plate 50, rotating mounting 5 through 180 degrees and replacing face plate 50. When face plate 50 has been tightened in position, clamps 51 and 52 (FIG. 3) are applied to restrain mounting 5 and workpiece 1 against any vertical movement. This precaution prevents accidental disturbance when the setup is moved between table 7 and an instrument bench in the operation of aligning the proper initial position of templet 3 with workpiece 1.

It will be understood that the setup and method of this invention, utilizing a rotatable electrode and a templet in close relation to a workpiece, on an electromachining equipment of the descending head and movable table type, can be used for cutting exterior contours on workpieces other than blanks intended for the making of punches. For example, the hard alloy inserts of milling machine cutter can be machined in a very similar way. In this case it is necessary to support the workpiece on a mounting which can be accurately indexed (that is, in this type of setup, rotated on a vertical axis) through equal successive angles smaller than 90 degrees. Such indexing mechanisms are well known. In this case the cutter is mounted on a vertical shaft that is clamped or otherwise fixed on an indexing mechanism mounted on the base plate. The retractable templet above the cutter is provided with the contour of one of the cutter teeth to be machined, and this contour is cut into the electrode wheel, which is chosen of a suitable width for machining only one tooth for each indexing position, the electrode being dressed after each indexing. It is also possible with a wider electrode wheel and a two or three tooth templet to machine two or three teeth at one pass if the material and configuration of the work will allow it (for example where a gear is being machined), in which case fewer indexing positions are necessary.

External contour electromachining is also valuable for making or duplicating lathe tools. A lathe tool, or a templet in the shape of the tool but made of metal of hardness sufficient only for shaping a carbon electrode wheel can be mounted to cut an electrode wheel, and then a hard alloy tool blank similarly held in the machine setup can be electromachined to the desired contour after retraction of the original or templet. As in the case of a punch, two operations with a precise rotation of the workpiece in between may be necessary for complete machining, but in the case of an unsymmetrical lathe tool it will usually be necessary to execute a similar rotation of the templet as well if a second machining operation is necessary.

The principal present need for the practice of the invention is, however, in the making of metal-working punches, because the advance in the art of internal contour electromachining has created a demand for equally effective methods of external contour electromachining which can utilize the same equipment for the movable table, machine head, electromachining power supply and servo control, electromachining fluid supply, recovery, filtration and recirculation, and servocontrol for the machine head. None of the foregoing elements of electromeachining equipment, used in boring dies and additionally usable in the practice of this invention for electromachining external contours, is shown in the annexed drawings, except for portions of the movable table in FIGS. 3 and 4 and a small part of the machine head in FIG. 3, for the reason that these are already in industrial use and are well known.

I claim:

1. A setup for an electromachining equipment of the type adapted to pierce dies by spark-discharge erosion, which equipment has a horizontally movable machine table for supporting a workpiece and a vertically movable machine head for supporting an electrode and is provided with means for controllably applying an electric potential suitable for spark-discharge machining between said electrode and said workpiece, means for supplying a flow of electromachining fluid between said electrode and said workpiece and means for controlling movement of said electrode towards said workpiece in such manner as to maintain a small clearance during electromachining, which setup is adapted to facilitate electromachining of external contours of a workpiece and for that purpose comprises: a workpiece, a templet having a portion shaped to the contour desired for part of the periphery of said workpiece, a common mounting for said workpiece and said templet, fixable on said machine table, holding said workpiece in alignment with said templet and permitting said templet to be retracted from its position in such alignment and to be reset accurately into such alignment, a wheel-shaped electrode rotatably mounted on a horizontal axis on said machine head, said electrode being made of conductive material soft enough to be cut by engagement with said templet and being mounted so that its periphery may, by movement of said table, be engaged by said templet to shape its contour and, thereafter, upon retraction of said templet, may be brought into electromaching relation with a side of said workpiece under automatic movement of said machine head, and means mounted on said machine head for rotating said electrode at an adjustable speed less than 60 revolutions per minute.

2. A setup for an electromachining equipment according to claim 1, which is particularly adapted for forming a punch and also an electrode for a die with which said punch is to be used, in which said workpiece has an electrode portion made of electrode material affixed upon a tool portion made of tool material in such a manner that both portions are colinearly electromachinable by said rotatable electrode, and in which said workpiece is fixed on a mounting permitting it to be rotated, independently of said templet, about the axis of symmetry of said workpiece for exactly 180° after one side thereof has been machined, in preparation for machining of the other side of said workpiece, without necessity of redetermining the working position of said templet.

3. A setup for an electromachining equipment according to claim 1, in which indexing means are provided for turning said workpiece independently of said templet through a predetermined angle between electromachining operations on said workpiece, and in which the axis of indexing is aligned with said templet so that the same setting of said templet may be used to dress said electrode in each indexing position to improve symmetry of the electromachined contour.

4. A method of electromachining with a machine of the type having a horizontally movable work-holding table, a vertically movable machine head adapted for carrying a machining electrode, a servosystem adapted to move said machine head to maintain an electromachining electrode at a small clearance from work held on said table, means for supplying electromachining fluid between said electrode and a workpiece mounted on said table and means for supplying electromachining potential to said electrode with respect to said workpiece, which method utilizes a carbon wheel-shaped electrode rotatable on a horizontal axis and drive means for rotating said electrode, both said electrode and said drive means being supported on said machine head, which method comprises the following steps: aligning a templet and said workpiece in a setup structure having a horizontal sliding mounting for said templet which is precisely movable, in such a way that the work contour of said templet is in alignment with a side of said workpiece which is to be machined to said contour and is separated from said workpiece by a small distance sufficient to avoid engagement of said workpiece by said electrode while said electrode is shaped by said templet, rotating said electrode at a shaping speed opposite said templet while adjusting the position of said table to cause said templet to cut its contour into the periphery of said electrode, retracting said templet in its sliding mount, rotating said electrode at an electromachining speed, in the direction which causes its periphery to move downward where it is opposite said workpiece, with application of electromachining fluid and electromagnetic potential while causing said machine head to move said electrode under electromachining servocontrol to machine an external contour of said workpiece.

5. A method of electromachining according to claim 4, in which said workpiece is mounted so that it may be precisely indexed on a vertical axis, in which method said workpiece is indexed by rotation through a predetermined angle after it has been electromachined in one position and, thereafter, the steps of shaping the electrode and electromachining the workpiece are repeated in the new position, with shaping determined by the same templet reset at its originally aligned position.

6. A method of electromachining in accordance with claim 4, in which said workpiece includes an upper portion made of electrode material and in which after electromachining said portion is separated from the rest of said workpiece and is mounted as a die electrode, after which a die is made from another workpiece by electromachining an aperture therein with said die electrode, whereby the die so made has a uniform and predetermined small clearance about the first-mentioned workpiece when the latter is used as a punch.

* * * * *